BEST AVAILABLE COPY T856026

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 19, 1968

856 O.G. 669

684,650

SEALING COMPOSITION

Bernard Michael Reges, Arbour Park, Newark, Del., assignor to E. I. du Pont de Nemours and Company, Wilmington, Del., a corporation of Delaware

Continuation-in-part of application Ser. No. 459,926, May 28, 1965. This application Nov. 21, 1967. Published Nov. 19, 1968

Class 260—28.5

No Drawing. 17 Pages Specification

A sealing composition for highway and building joints comprising a mixture of (a) a chloroprene polymer (b) a coal tar pitch, and (c) at least one aliphatic amine curing agent.